United States Patent
Gorenc

(10) Patent No.: US 10,252,094 B1
(45) Date of Patent: Apr. 9, 2019

(54) FIRE EXTINGUISHER MANIFOLD WITH SAFETY INTERLOCK CROSS-BOLT

(71) Applicant: The United States of America as Represented by the Secretary of the United States Army, Washington, DC (US)

(72) Inventor: Louis J. Gorenc, Westland, MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 306 days.

(21) Appl. No.: 15/293,897

(22) Filed: Oct. 14, 2016

(51) Int. Cl.
*A62C 35/02* (2006.01)
*A62C 35/68* (2006.01)
*F16K 35/00* (2006.01)

(52) U.S. Cl.
CPC ............ *A62C 35/68* (2013.01); *A62C 35/023* (2013.01); *F16K 35/00* (2013.01)

(58) Field of Classification Search
CPC ........ A62C 35/68; A62C 35/023; F16K 35/00
See application file for complete search history.

(56) References Cited

U.S. PATENT DOCUMENTS

| | | | |
|---|---|---|---|
| 4,419 A | 3/1846 | Clarke | |
| 580,924 A | 4/1897 | Browning | |
| 1,701,027 A | 2/1929 | Brown | |
| 2,236,104 A | 3/1941 | McIntosh | |
| 2,541,073 A | 2/1951 | Kaufman | |
| 2,671,516 A | 3/1954 | Grant, Jr. | |
| 2,736,919 A | 3/1956 | Nurkiewicz | |
| 2,829,720 A | 4/1958 | Heigis | |
| 3,643,691 A | 2/1972 | Huthsing, Jr. | |
| 3,864,048 A | 2/1975 | Parker | |
| 4,426,063 A * | 1/1984 | Bormioli | F16L 37/086 137/614.06 |
| 4,553,589 A | 11/1985 | Jennings | |
| 4,589,496 A * | 5/1986 | Rozniecki | A62C 35/02 137/68.13 |
| 4,658,481 A | 4/1987 | Seyler et al. | |
| 4,658,907 A | 4/1987 | Popp | |
| 4,684,037 A | 8/1987 | Gnutti et al. | |
| 4,782,564 A | 11/1988 | Sloan | |
| 4,982,798 A | 1/1991 | Wang | |
| 5,622,199 A * | 4/1997 | Pieper | E02F 9/2004 137/15.18 |
| 5,671,777 A * | 9/1997 | Allen | F16L 37/36 137/614.06 |

(Continued)

*Primary Examiner* — Eric Keasel
(74) *Attorney, Agent, or Firm* — Gregory P. Gibson; Gary A. Smith; Thomas W. Saur

(57) ABSTRACT

A fire extinguisher system that generally provides a passive ability to prevent at least some inadvertent discharge events. The fire extinguisher system having a passively activated (turned on) and deactivated (turned off) sliding safety interlock cross shaft structure. The system interlock operation is generally performed without an operator performing any new or additional tasks in addition to those tasks that are typically implemented during installation, repair, and/or maintenance tasks. The safety interlock shaft is generally shaped and positioned to prevent inadvertent discharge of fire extinguishing chemicals via propellant when the outlet does not have either of a discharge conduit (pipe, tubing, or the like) or the anti-recoil plug properly installed therein.

18 Claims, 4 Drawing Sheets

(56) References Cited

U.S. PATENT DOCUMENTS

| | | | |
|---|---|---|---|
| 5,676,190 | A | 10/1997 | Matsumoto et al. |
| 5,816,331 | A | 10/1998 | Vivier |
| 5,822,866 | A | 10/1998 | Pardue |
| 5,832,779 | A | 11/1998 | Madrid |
| 6,131,666 | A | 10/2000 | Pelzel et al. |
| 6,378,618 | B1 | 4/2002 | Yang et al. |
| 6,733,276 | B1 | 5/2004 | Kopping |
| 6,952,895 | B1 | 10/2005 | Zonshine |
| 7,287,548 | B2 * | 10/2007 | Bleys ............... F16K 1/304 137/505.25 |
| D648,000 | S | 11/2011 | Shimura et al. |
| D648,419 | S | 11/2011 | Shimura et al. |
| 8,857,790 | B2 * | 10/2014 | Wong ............... F16K 27/067 251/149.9 |
| 8,899,262 | B2 * | 12/2014 | Wadham ............ F16K 1/30 137/492.5 |
| 9,974,988 | B2 * | 5/2018 | Baxendell ............ A62C 3/07 |
| 10,024,454 | B2 * | 7/2018 | Baxendell ............ F16K 31/082 |
| 2007/0079972 | A1 | 4/2007 | Gross |
| 2007/0295519 | A1 | 12/2007 | Yoshida |
| 2013/0014964 | A1 | 1/2013 | Yoshida |

\* cited by examiner

FIRE EXTINGUISHER MANIFOLD WITH SAFETY INTERLOCK CROSS-BOLT

GOVERNMENT INTEREST

The inventions described herein may be made, used, or licensed by or for the U.S. Government for U.S. Government purposes without payment of royalties to me.

STATEMENT REGARDING PRIOR DISCLOSURES BY AN INVENTOR OR JOINT INVENTOR

None

BACKGROUND OF THE INVENTION

1. Field of the Invention

The present invention generally relates to fire extinguishers and/or fire extinguisher systems and, in particular, to a fire extinguisher manifold with a safety interlock cross-bolt.

2. Description of Related Art

Referring to FIG. 1, a conventional fire extinguisher system manifold assembly 10 is shown. As is known to one of skill in the art, conventional fire extinguisher systems include one or more of the fire extinguisher manifolds (e.g., coupling junction boxes, interface subassemblies, body, etc.) 12 and replaceable bottles (e.g., canisters, cans, containers, and the like) which are well known to one of skill in the art; hence, not illustrated, wherein the bottles contain high pressure propellant and fire extinguishing chemicals. The system manifold assembly 10 includes the body 12, and the body 12 has a chamber (void, plenum, etc.) 14, an inlet 16, and an outlet 18. The bottles are operatively mounted (i.e., coupled, connected, attached, etc.) to the fire extinguisher manifolds in a removable/replaceable manner (typically by threaded engagement) with the manifold inlet 16. Included internally in the fire extinguisher manifold 12 is a discharge valve (poppet) 30, shown in the closed (non-discharged) position. The valve 30 has a head 34. The valve head 34 is shown closing the inlet 16 relative to the chamber 12. The end of the valve 30 that is opposite the head 34 is generally connected to structure or mechanism (not shown) that actuates the valve 30. Discharge nozzles (e.g., vents, diffusers, megaphones, etc.), also not illustrated, may be operatively mounted directly into the manifold body 12 at the outlet 18; and/or pipes (e.g., plumbing, lines, conduits, hoses, etc.), likewise not illustrated, that are fluidly coupled (i.e., connected, attached, installed, etc.) to discharge nozzles may also be operatively mounted into the manifold body at the manifold outlet 18.

The fire extinguishing chemicals are discharged from the bottles through the nozzles by the propellant when the discharge valve 30 is opened (e.g., the valve 30 is moved as indicated by the arrow labeled "DISCHARGED" thus opening the inlet 16 to the chamber 14). When a bottle has been discharged and/or repair or maintenance on the system 10 is performed, the bottle is removed from the manifold inlet 16. However, for safe operation, prior to removing the bottle from the manifold body 12, the discharge nozzle or pipe that is mounted into the manifold outlet 18 is first disconnected from the manifold 12 and an outlet device (e.g., anti-recoil plug, or the like) 50 is installed into operational engagement with the manifold outlet 18. An outlet device may be any element (or combination of elements) which when installed into operational engagement with the manifold serves to control (prevent, restrict, direct, etc.) the flow of pressurized fluid from the fire suppressant bottle. Examples of such an outlet device are a discharge nozzle, conduit, anti-recoil plug, plate, block, cap, etc. For user convenience, the outlet device 50 is often secured on the bottle or near the manifold outlet via a lanyard (e.g., cord, chain, cable, etc.), not illustrated.

If the outlet device 50 is not in operative engagement with the manifold 12 and the discharge valve 30 is inadvertently opened or the bottle inadvertently discharges, an incident wherein the high pressure propellant may blast against the user or may forcefully push the bottle can result, and the user may be injured or other collateral damage may occur during the incident. The term "operative engagement," as used herein in relation to an outlet device, refers to a position wherein the outlet device is mounted to a manifold outlet in a manner to prevent the flow of pressurized fluid through the outlet when a discharge valve is opened.

One example of a conventional fire extinguisher system designed to reduce the likelihood of accidental or inadvertent fluid discharge is shown and described in U.S. Pat. No. 2,671,516, issued Mar. 9, 1954 to Grant, Jr. Another example of a fluid distribution system that can be implemented in connection with fire extinguishing systems is U.S. Pat. No. 2,829,720, issued Apr. 8, 1958 to Heigis, et al. U.S. Pat. No. 4,553,589, issued Nov. 19, 1985 to Jennings, et al. is directed to a Fire-safe surface-controlled subsurface safety valve control line/wellhead connector and blowout preventer.

However, most conventional fire extinguisher systems (e.g., fire extinguisher systems similar to the apparatus illustrated in FIG. 1) depend on the user to install the anti-recoil plug 50 into the manifold outlet 18 before removing or installing the bottle. In some cases the user may fail to do so and, if the discharge valve 30 is inadvertently moved to the discharged/open position, injury to the user may result. As such, there is a desire for an improved fire extinguisher system that may passively (i.e., without additional deliberate action on the part of the user) reduce or prevent the inadvertent discharge of the high pressure propellant and do so without interfering with normal fire extinguisher system function and performance.

SUMMARY OF THE INVENTION

Accordingly, the present invention may provide an improved fire extinguisher manifold assembly that may be used in connection with a fire extinguisher system.

The improved fire extinguisher manifold assembly generally includes a safety interlock that may automatically (i.e., without the need for additional deliberate user action) prevent the manifold discharge valve from opening when a nozzle or discharge conduit (pipe, hose, tubing, and the like) is disconnected from the manifold outlet, and an anti-recoil plug is not installed. Likewise, when an anti-recoil plug, a nozzle, or a discharge pipe is installed in the manifold, the safety interlock is positioned to provide normal discharge valve operation.

In a disclosed embodiment of the invention, a fire extinguisher manifold assembly comprises a manifold having an inlet and an outlet, and a valve having a non-discharged position wherein the valve closes the inlet and a discharged position wherein the valve permits fluid communication between the inlet and the outlet. A safety interlock cross-bolt is mounted in the manifold for linear movement between: a)

a first position wherein the cross-bolt blocks movement of the valve away from the non-discharged position to the discharged position, and b) a second position wherein the cross-bolt permits movement of the valve away from the non-discharged position. The cross-bolt is biased toward the first position (by, for example, a coil spring). A portion of the cross-bolt is located within the outlet such that when an outlet device is inserted into operational engagement with the outlet, the outlet device contacts the portion and urges the SIBC to the second position.

In a further disclosed embodiment of the invention, the manifold comprises a mounting boss defining a through-hole and the cross-bolt is mounted in the through-hole for linear movement.

In at least one embodiment of the invention, the manifold further comprises a second mounting boss having a second through-hole co-axial with the through-hole, and the cross-bolt is slidably mounted in the through-hole and the second through-hole for linear movement.

The system may further include an outlet device comprising an annular surface which contacts the cross-bolt and urges the cross-bolt to the second position.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Definitions and Terminology

Figure 1:
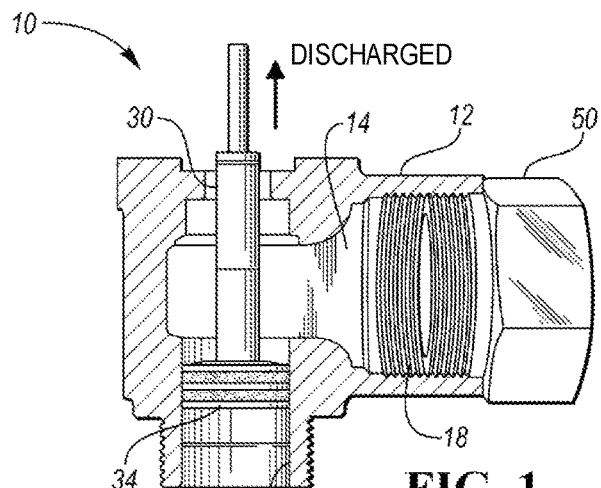
FIG. 1 is a sectional side elevation view that illustrates a conventional fire extinguisher control valve assembly.

The following definitions and terminology are applied as understood by one skilled in the appropriate art.

The singular forms such as "a," "an," and "the" include plural references unless the context clearly indicates otherwise. For example, reference to "a material" includes reference to one or more of such materials, and "an element" includes reference to one or more of such elements.

As used herein, "substantial" and "about", when used in reference to a quantity or amount of a material, characteristic, parameter, and the like, refer to an amount that is sufficient to provide an effect that the material or characteristic was intended to provide as understood by one skilled in the art. The amount of variation generally depends on the specific implementation. Similarly, "substantially free of" or the like refers to the lack of an identified composition, characteristic, or property. Particularly, assemblies that are identified as being "substantially free of" are either completely absent of the characteristic, or the characteristic is present only in values which are small enough that no meaningful effect on the desired results is generated.

A plurality of items, structural elements, compositional elements, materials, subassemblies, and the like may be presented in a common list or table for convenience. However, these lists or tables should be construed as though each member of the list is individually identified as a separate and unique member. As such, no individual member of such list should be considered a de facto equivalent of any other member of the same list solely based on the presentation in a common group so specifically described. It is considered axiomatic that one of ordinary skill in the art is familiar with the technology implemented as described herein. Thus, the understanding, for instance, that a cylindrical shaft or rod has two ends, length and diameter is presumed. Likewise, the manner of illustrating the subject matter as implemented in the Figures which implement partial sectional views is a practice well known to one of skill in the art such that the teachings embodied thereon are readily discernable and clearly understood. See, for example, the drawings and related descriptions of U.S. Pat. Nos. 2,671,516 and 2,829,720, both of which are incorporated by reference in their entirety.

Concentrations, values, dimensions, amounts, and other quantitative data may be presented herein in a range format. One skilled in the art will understand that such range format is used for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a size range of about 1 dimensional unit to about 100 dimensional units should be interpreted to include not only the explicitly recited limits, but also to include individual sizes such as 2 dimensional units, 3 dimensional units, 10 dimensional units, and the like; and sub-ranges such as 10 dimensional units to 50 dimensional units, 20 dimensional units to 100 dimensional units, and the like.

As used herein, elements having numbers more than 9 and less than 100 generally refer to conventional elements known in the art by one having ordinary skill with respect to fire extinguisher systems and methods, and the like; while elements number 100 and above refer to the present invention, or elements, components, and the like thereof. If included, like numbered elements generally refer to the same element; however, the like numbered elements may include a suffix "L" to designate the left side element and a suffix "R" to designate the right side element when left and right elements are mirrors of each other. Likewise, for similar elements that are implemented in locations at or near the top of the environment, a suffix "T" may be implemented to designate and distinguish from the element implemented in locations at or near the bottom of the environment which may include the suffix "B". Alternative embodiments of an element that retain similar characteristics may also be designated via a "prime" (i.e., ') symbol.

One of skill in the art is assumed to have knowledge of the general physical properties, manufacture, implementation, and use of the components and systems described below. Where deemed appropriate, teachings of issued U.S. patents and/or published patent applications are noted and incorporated by reference in their entirety. As would be understood and appreciated by one of skill in the art, elements, in whole or in part, may be omitted from some Figures and/or views for clarity of illustration without diminishing the patentability of the present invention.

Conventional elements (numbered between 10 and 99) include:
10: a conventional fire extinguisher system as generally may be installed inside the crew cabin of a vehicle;
12: manifold (e.g., housing, coupling junction boxes, interface subassembly, body, etc.);
14: chamber (void, plenum, cavity, hollow, etc.);
16: inlet hole (bore);
18: outlet hole (bore);
30: valve (poppet, poppet valve, etc.);
34: valve head;
50: outlet device (e.g., anti-recoil plug (recoil plug, cap, bung, and the like), piping coupling, diffuser, nozzle, and the like, collectively referred to as the outlet device) wherein the outlet device 50 is configured to be threadably installed into the outlet 18; and
52: lip section (portion, region, ring, interlock interface, safety interface surface, etc.) annularly surrounding the axis of the outlet device 50 at the termination of the threaded section of the outlet device 50.

Elements (numbered 100 and above, and including English and Greek alphabetical characters, if used) of and/or pertaining to the present invention may include but are not necessarily included in all embodiments and are not limited to:
100: fire extinguisher system (e.g., device, apparatus, assembly, and the like) having a manifold with a safety interlock cross-bolt;
112: manifold (e.g., housing, coupling junction boxes, interface subassembly, body, etc.);
114: chamber (e.g., void, plenum, cavity, hollow, etc.);
116: inlet (bottle pipe coupling region, hole, bore);
118: outlet (discharge coupling region, hole, bore);
200: safety interlock cross-bolt (e.g., shaft, bolt, bar, pin, rod, and the like);
210: inner (interface, first end) section of the shaft 200;
212: stop collar (ring, donut) section of the shaft 200;
220: intermediate (clearance, waist) section of the shaft 200;
222: outer (blocking, second end) section of the shaft 200;
230: spring (e.g., a helically wound, linear resilient member);
236: cap screw (retainer, closing member, etc.);
240: outlet mounting boss (block, member, flange, lug, etc.);
246: inlet mounting boss (block, member, flange, lug, etc.);
260: through-hole in the outlet boss 240 (first outlet mounting boss through-hole);
262: through-hole in the inlet boss 246 (second outlet mounting boss through-hole);
D1: diameter of the inner section 210;
D2: diameter of the stop collar 212;
D3: diameter of the intermediate section 220;
D4: diameter of the outer section 222;
LC: length of the intermediate (clearance) section of the shaft 200; and
LS: length of the outer (blocking, second end) section of the shaft 200.

With reference to the Figures, the preferred embodiments of a fire extinguisher system will now be described in detail. Generally, the fire extinguisher system provides an improved system that implements a manifold having a safety interlock. In particular, the fire extinguisher system 100 is generally provided. Environments where the improved fire extinguisher system 100 may be implemented include, but are not limited to, vehicles such as tanks, armored personnel carriers, armored fighting vehicles; static structures such as buildings, above-ground portions of bunkers or shelters, containers for the storage of fuel, chemicals, munitions; and the like. The environment in which the fire extinguisher system 100 is implemented generally forms no part of the invention.

The fire extinguisher system 100 generally provides a passive ability to prevent at least some inadvertent discharge events. The fire extinguisher system 100 can be realized (implemented) through embodiments as described below and shown on the included Figures, having a passively activated (turned on or engaged) and deactivated (turned off or disengaged) sliding safety interlock cross shaft 200 structure. That is, the system 100 interlock operation is generally performed without an operator performing any new or additional tasks in addition to those tasks that are typically implemented during installation, repair, and/or maintenance tasks. The safety interlock shaft 200 is generally shaped, sized, and positioned to prevent inadvertent discharge of fire extinguishing chemicals via propellant at any and all times at which an outlet device 50 (for example, any of a discharge conduit, anti-recoil plug, or other implementation of an outlet device) is not in operative engagement with the outlet 118.

Figure 2:
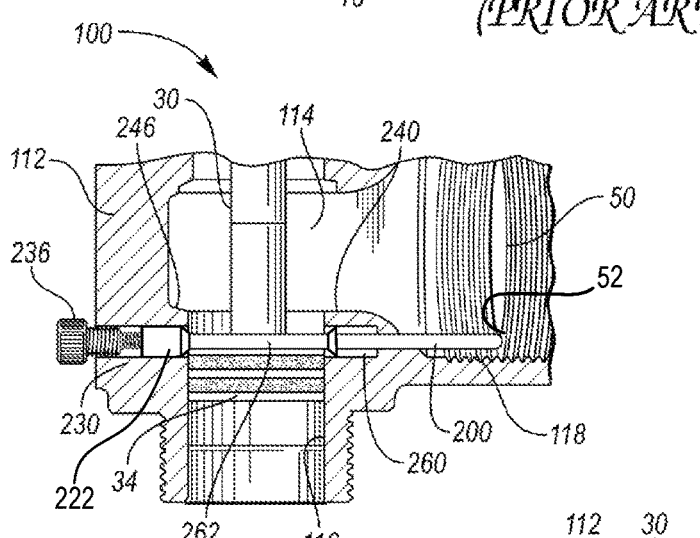
FIG. 2 is a sectional side elevation view that illustrates an embodiment of an improved fire extinguisher control valve assembly with the valve in the non-discharged position and the safety interlock in the unlocked position (i.e., with an outlet device operatively installed)
Figure 3:
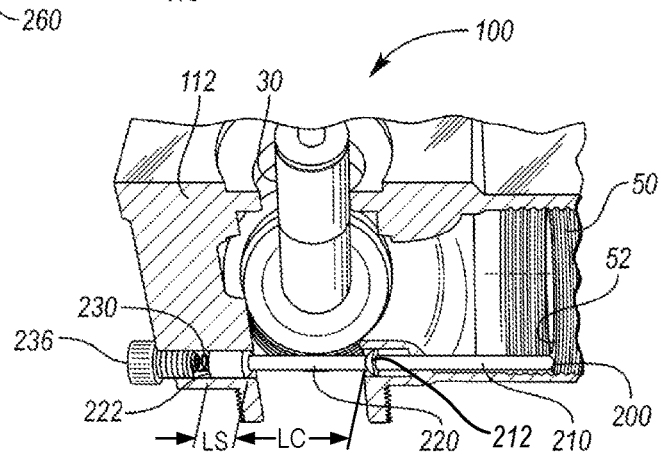
FIG. 3 is a sectional view of the fire extinguisher control valve assembly of FIG. 2, taken at approximately a 45° angle to the axis of movement of the valve.
Figure 4:
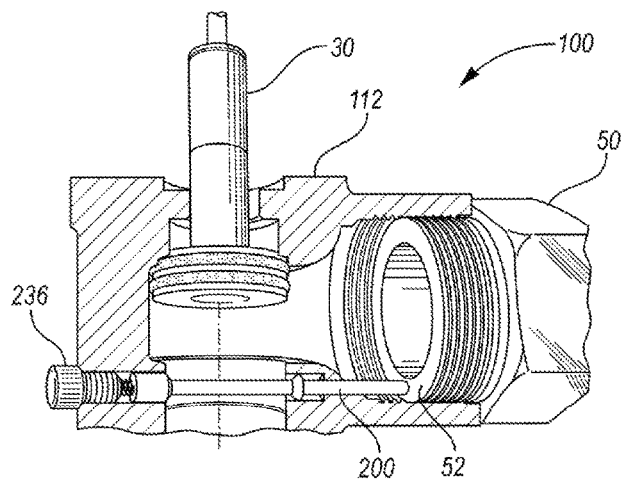
FIG. 4 is a sectional side elevation view, similar to FIG. 2, that illustrates the fire extinguisher control valve assembly of FIG. 2 with the valve in the discharged position and the safety interlock in the unlocked position.

Referring to FIGS. 2, 3, and 4, in FIG. 2, a sectional side view that illustrates an embodiment of the fire extinguisher control valve assembly 100 with the valve 30 in the non-discharged position (i.e., the valve head 34 closes the inlet 116 from communication with the chamber 114), and the safety interlock 200 in the fully disengaged (unlocked) position is shown. The manifold 112 generally comprises the internal chamber 114; wherein the chamber 114 includes the inlet 116, and the outlet 118, all of which are in fluid communication within the manifold 112. Internal to the chamber 114, the manifold 112 also comprises the outlet mounting boss (block, member, flange, lug, etc.) 240, and the inlet mounting boss 246 (shown in further detail in FIGS. 8-9). The inlet 116 and the outlet 118 are generally in a plane, and at substantially right angles to each other. As would be known to one of skill in the art, during normal operation a bottle (not shown) containing fire extinguishing chemicals and propellant is generally threadably mounted to the inlet 116, and a pipe coupling (fitting) or diffuser is generally threadably installed at the outlet 118. Note, while the element 50 is illustrated as an anti-recoil plug, the element 50 may be collectively referred to as an outlet device which includes, but is not limited to such devices as anti-recoil plugs, piping couplings, diffusers, nozzles, and the like as would be known to one of skill in the art. Alternatively, during installation, removal, repair and maintenance, and the like operations, the outlet device (e.g., an anti-recoil plug or other embodiment of the outlet device) 50 is threadably installed at the outlet 118.

In FIG. 3, a sectional view taken at approximately a 45° angle to the axis of movement of the valve 30 that also illustrates the safety interlock 200 in the unlocked position with the valve 30 in the non-discharged position is shown. When the outlet device 50 (such as an anti-recoil plug) is threadably installed into the outlet 118, the annular lip section 52 contacts the distal end of the inner end section 210 of the safety interlock 200. As the outlet device 50 is further threadably tightened into operative engagement with the manifold, the helical spring 230 is compressed, and the interlock shaft 200 is slid (e.g., pushed, urged, moved, forced, etc.) "inward" (to the left, as viewed in FIG. 3) towards the retention screw 236. In FIG. 4, a view similar to FIG. 2, but with the valve 30 illustrated in the discharged position is shown. As the interlock shaft 200 is at the unlocked position, the valve 30 was free to move to the DISCHARGED state in response to triggering of an actuator subassembly (not shown), as is well known to one of skill in the art.

Figure 8:
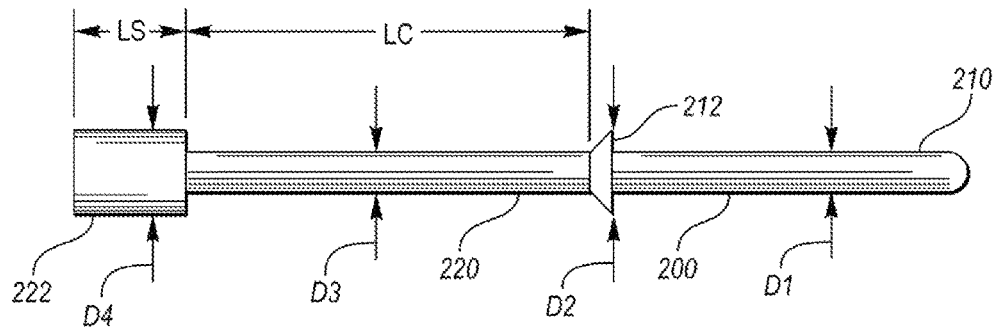
FIG. 8 is a side elevation view of the safety interlock cross-bolt of the fire extinguisher control valve assembly of FIG. 2.

As best illustrated in FIG. 8, the disclosed embodiment of the safety interlock cross-bolt 200 comprises a substantially cylindrical shaft (bolt, rod, pin, bar, or the like) having at least four sections (regions); e.g., the inner (first) end section 210 having the diameter, D1; the stop collar (ring, donut) section 212 having the diameter, D2; the intermediate (clearance) section 220 having the diameter, D3, and the length, LC; and, the outer (blocking, second) section 222 having the diameter, D4, and the length, LS. While the stop collar section 212 is illustrated having a truncated conical shape with the narrower portion of the cone at the intersection with the intermediate section 220, the shape of stop collar section 212 is not limited to only conical implementations.

The outlet mounting boss 240 and the inlet mounting boss 246 oppose each other across a segment of the inlet 116 that enters the chamber 114. The outlet mounting boss 240 includes an outlet mounting boss through-hole 260 formed therein. The inlet mounting boss 246 includes an inlet mounting boss through-hole 262 formed therein. The outlet mounting boss through-hole 260 has a larger diameter than the inlet mounting boss through-hole 262. The inlet side mounting boss through-hole 262 and the outlet side mounting boss through-hole 260 are co-axial with one another.

The interlock cross-bolt 200 is slidably mounted (e.g., installed, assembled, fit, etc.) within the inlet mounting boss through-hole 262 and the outlet mounting boss through-hole 246. The diameter, D1, of the inner end section 210 is generally sized to snugly, but slidably fit in the outlet mounting boss through-hole 260. The diameter, D2, of the stop collar 212 is generally sized to snugly, but slidably fit in the inlet mounting boss through-hole 262. As such, when the spring 230 urges the safety interlock 200 towards the outlet 118, the interference of the stop collar 212 at the outlet mounting boss through-hole 260 stops further movement of the safety interlock shaft 200.

Figure 5:
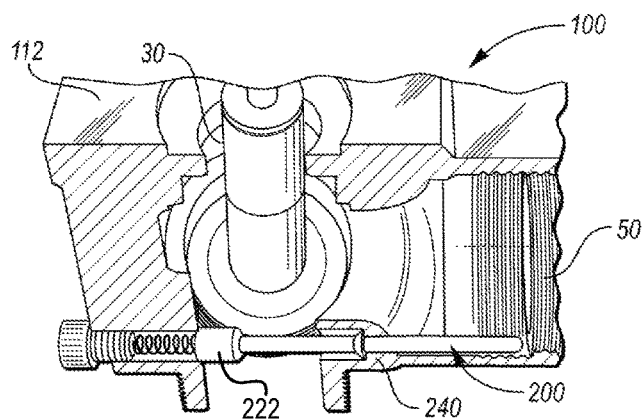
FIG. 5 is a sectional view of the fire extinguisher control valve assembly of FIG. 2, taken at approximately a 45° angle to the axis of movement of the valve that illustrates the safety interlock in the locked (i.e., "safe") position (i.e., without an outlet device installed)

The diameter, D3, and the length, LC, of the intermediate section 220 are generally sized to provide clearance such that, when the safety interlock cross-bolt 200 is in the unlocked position, the valve head 34 is free (i.e., permitted) to move into the DISCHARGED position. The diameter D4, of the outer (blocking) section 222 of the safety interlock cross-bolt 200 is generally sized to snugly, but slidably fit in the inlet mounting boss through-hole 262; and such that, in connection with the length, LS, of the outer (blocking) section 222, when the outlet 118 does not have the outlet device (e.g., piping or an anti-recoil plug) 50 correctly installed, the blocking section 222 interferes with and stops (blocks, prevents) motion of the valve head 34 towards the DISCHARGED position as shown in FIG. 5. The inlet mounting boss through-hole 262 is also generally threaded to receive the cap screw 236. The cap screw 236 retains the spring 230 and the safety interlock 200 within the manifold 112, and provides initial, linear compression to the spring 230.

Figure 6:
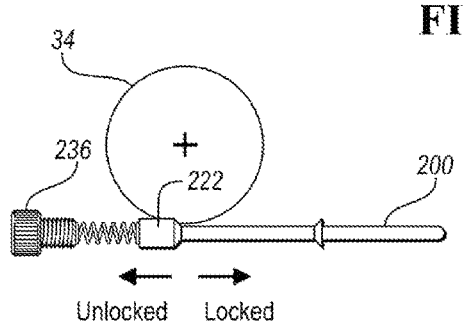
FIG. 6 is a top schematic view that illustrates elements of an embodiment of the fire extinguisher control valve assembly of FIG. 2 with the safety interlock in the locked position.
Figure 7:
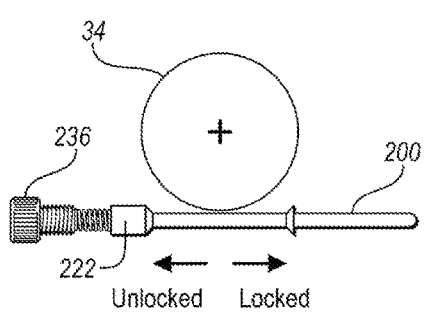
FIG. 7 is a top schematic view similar to FIG. 6 with the safety interlock in the unlocked position.

Referring to FIGS. 6-7, schematic top views wherein elements of an embodiment of the fire extinguisher control valve assembly 100 of FIG. 2 with the safety interlock 200 in the locked position (see, FIG. 6); and the unlocked position (see, FIG. 7) are further illustrated. The right angle orientation of the inlet 116 relative to the outlet 118 generally provides a path for the safety interlock bolt 200 to slidably travel such that, when the outlet 118 does not have the outlet device (e.g., piping or an anti-recoil plug) 50 correctly installed, the blocking section 222 interferes with and blocks motion of the valve head 34 towards the DISCHARGED position.

Figure 9:
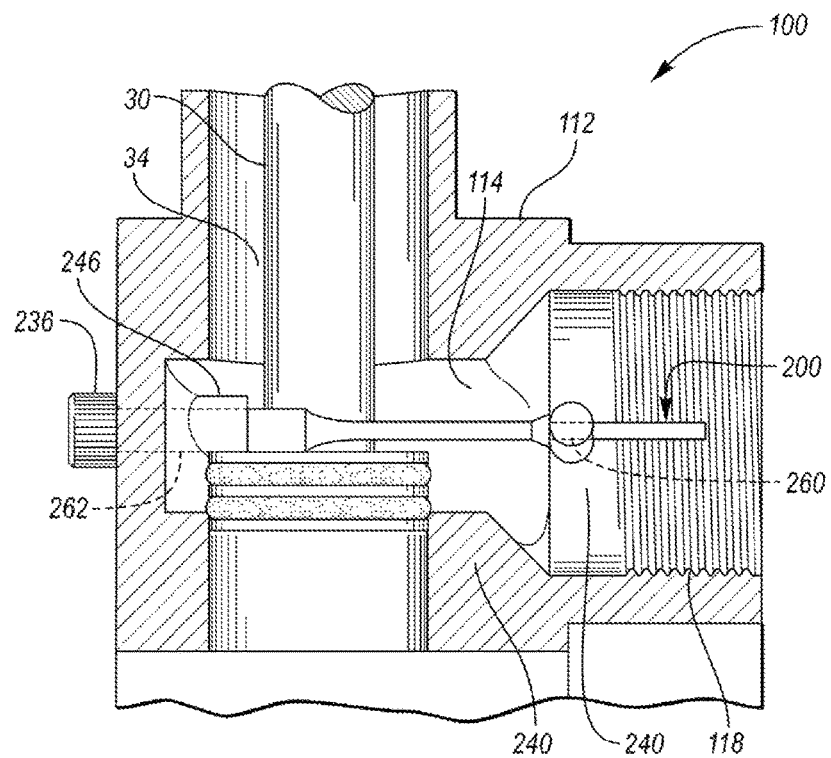
FIG. 9 is a side elevation sectional view of an embodiment of the fire extinguisher control valve assembly of FIG. 2 with the safety interlock in the locked position.

Referring to FIG. 9, a side elevation sectional view of an embodiment of the fire extinguisher control valve assembly of FIG. 2 with the safety interlock in the locked position is illustrated. There is no outlet device inserted into outlet 118 to obstruct movement of the safety interlock 200 fully to the right (as viewed in FIG. 9), so that the spring 230 and cap screw 236 urge the safety interlock 200 to the position shown.

Figure 10:
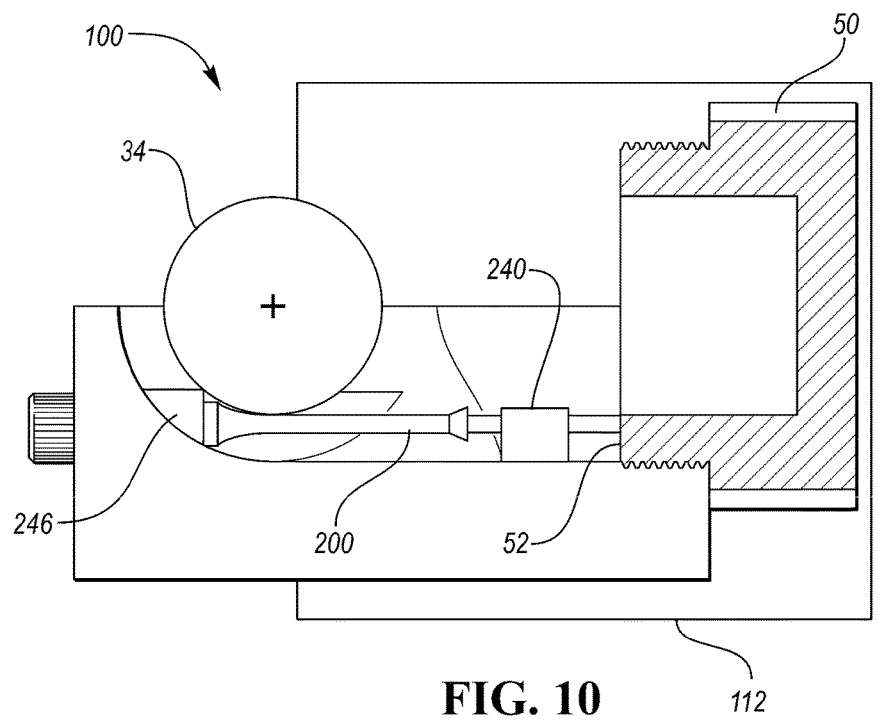
FIG. 10 is a top plan sectional view that illustrates an embodiment of the fire extinguisher control valve assembly of FIG. 2 with the safety interlock in the unlocked position.

In contrast, referring to FIG. 10, a top plan sectional view that illustrates an embodiment of the fire extinguisher control valve assembly of FIG. 2 with the safety interlock in the unlocked position (i.e., movement of the valve 30 to the DISCHARGED position is permitted) is illustrated. The outlet device 50 is shown to be inserted into outlet 118 far enough for the lip section 52 to bear against the end of safety interlock inner section 210 and urge the safety interlock 200 to the left (as viewed in FIG. 10) against the force of the spring 230 to the unlocked position shown.

In FIGS. 9-10, the edge of the blocking section 222 that interfaces to the intermediate section 220 is illustrated as having a conical shape wherein the narrower portion of the cone is at the interface to the intermediate section 220.

Figure 11A:
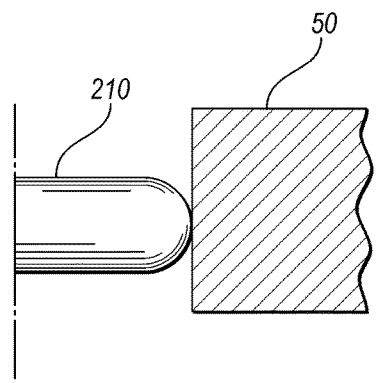
FIG. 11A is a partial side elevation view of a first embodiment of the safety interlock of the fire extinguisher control valve assembly of FIG. 2 and an outlet device.
Figure 11B:
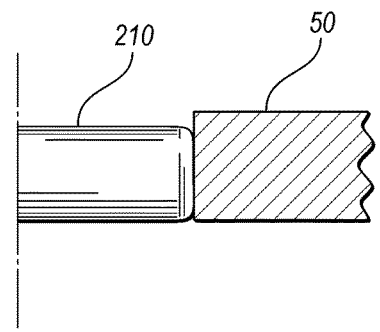
FIG. 11B is a partial side elevation views of a second embodiment of the safety interlock of the fire extinguisher control valve assembly of FIG. 2 and an outlet device.

Referring to FIGS. 11A-11B, partial side elevation views of embodiments of the safety interlock 200 of the fire extinguisher control valve assembly 100 of FIG. 2 and the outlet device (e.g., anti-recoil plug) 50 are illustrated. In particular, the interface at the end of the inner section 210 of the interlock shaft 200 and the lip section 52 is shown. In FIG. 11A, the distal end of the inner section 210 of the interlock shaft 200 is shown rounded (e.g., radiused, rounded off, blunted, and the like) in a substantially half-spherical shape. In FIG. 11B, the distal end of the inner section 210 of the interlock shaft 200 is shown rounded off at a less than half-spherical shape. Providing a radius (i.e., rounding off) to the outer edge of the end of the inner section 210 may reduce or eliminate drag or resistance that may impede the installation of the outlet device (e.g., piping or the anti-recoil plug) 50 into the outlet 118.

While the invention may have been described with reference to certain embodiments, numerous changes, alterations and modifications to the described embodiments are possible without departing from the spirit and scope of the invention as defined in the appended claims, and equivalents thereof.

What is claimed is:

1. A fire extinguisher manifold assembly comprising:
a manifold having an inlet, an outlet, and a mounting boss defining a through-hole;
a valve having a non-discharged position wherein the valve closes the inlet and a discharged position wherein the valve permits fluid communication between the inlet and the outlet;
a safety interlock cross-bolt mounted in the through-hole of the manifold for linear movement between: a) a first position wherein the cross-bolt blocks movement of the valve away from the non-discharged position to the discharged position, and b) a second position wherein the cross-bolt permits movement of the valve away from the non-discharged position, the cross-bolt biased toward the first position and having a portion located within the outlet such that when an outlet device is inserted into operational engagement with the outlet the outlet device contacts the portion and urges the cross-bolt to the second position;
a cap screw; and
a spring; and wherein
the cap screw is threadingly engaged with the through-hole and retains the spring to bias the cross-bolt toward the first position.

2. The fire extinguisher manifold assembly of claim 1, wherein the cross-bolt comprises an inner section slidably engaging the through-hole and a stop collar section axially adjacent to the inner section, the stop collar section having an outer diameter greater than a diameter of the through-hole.

3. The fire extinguisher manifold assembly of claim 1, wherein the manifold further comprises a second mounting boss having a second through-hole co-axial with the through-hole, and the cross-bolt is slidably mounted in the through-hole and the second through-hole for linear movement.

4. The fire extinguisher manifold assembly of claim 1, wherein the inlet and the outlet are oriented at substantially right angles to each other.

5. The fire extinguisher manifold assembly of claim 1, wherein the cross-bolt is located such that the portion of the cross-bolt located within the outlet is contacted.

6. The fire extinguisher manifold assembly of claim 1, wherein the cross-bolt is configured to be contacted by an annular surface of the outlet device.

7. A fire extinguisher manifold assembly comprising:
a manifold body having an inlet adapted to removably receive a fire bottle containing a pressurized fluid, an outlet adapted to removably receive an outlet device for controlling flow of the fluid through the outlet, and a mounting boss defining a through-hole;
a valve movable between a non-discharged position wherein a head of the valve closes the inlet to contain the fluid within the fire bottle attached to the inlet and a discharged position wherein the head permits the fluid to flow from the inlet to the outlet;
a safety interlock cross-bolt mounted in the through-hole of the manifold body for linear movement between: a) a first position wherein the cross-bolt blocks movement of the valve away from the non-discharged position, and b) a second position wherein the cross-bolt permits movement of the valve away from the non-discharged position, the cross-bolt biased toward the first position and having a portion extending into the outlet such that insertion of the outlet device urges the cross-bolt to the second position;
a cap screw; and
a spring; and wherein the cap screw is threadingly engaged with the through-hole and retains the spring to bias the cross-bolt toward the first position.

8. The fire extinguisher manifold assembly of claim 7, wherein the cross-bolt comprises an inner section slidably engaging the through-hole and a stop collar section axially adjacent to the inner section, the stop collar section having an outer diameter greater than a diameter of the through-hole.

9. The fire extinguisher manifold assembly of claim 7, wherein the manifold body further comprises a second mounting boss having a second through-hole co-axial with the through-hole, and the cross-bolt is slidably mounted in the through-hole and the second through-hole for linear movement.

10. Apparatus comprising:
a manifold having an inlet, an outlet, and a mounting boss defining a through-hole, the inlet adapted to removably receive a bottle containing a pressurized fluid;
an outlet device removably engageable with the outlet to control flow of the fluid through the outlet;
a valve movable along an axis between a non-discharged position wherein the valve closes the inlet to prevent flow of the fluid into the manifold from the bottle, and a discharged position wherein the valve permits the fluid to flow into the manifold;
a safety interlock cross-bolt mounted in the through-hole of the manifold for linear movement between: a) a first position wherein the cross-bolt blocks axial movement of the valve away from the non-discharged position, and b) a second position wherein the cross-bolt permits axial movement of the valve away from the non-discharged position, the cross-bolt biased toward the first position and extending into the outlet such that insertion of the outlet device urges the cross-bolt to the second position;
a retainer engaging the through-hole;
a biasing member disposed between the retainer and the cross-bolt; and wherein
the biasing member biases the cross-bolt toward the first position.

11. The apparatus of claim 10, wherein the outlet device comprises an annular surface contacting the cross-bolt and urging the cross-bolt to the second position.

12. The apparatus of claim 10, wherein the cross-bolt comprises an inner section slidably engaging the through-hole and a stop collar section axially adjacent to the inner section, the stop collar having an outer diameter greater than a diameter of the through-hole.

13. The apparatus of claim 10, wherein the biasing member comprises a spring biasing the cross-bolt toward the first position.

14. The apparatus of claim 10, wherein:
the retainer comprises a cap screw; and
the biasing member comprises a spring.

15. The apparatus of claim 10, wherein the retainer adjustably engages the through-hole.

16. The apparatus of claim 10, wherein:
the manifold defines a fluid flow path therethrough between the inlet and the outlet; and the cross-bolt is positioned in the fluid flow path within the manifold.

17. The apparatus of claim 16, wherein:

the inlet comprises a bore;

the valve moves within the bore; and the cross-bolt is disposed across the bore.

18. The apparatus of claim 10, wherein:

the apparatus defines a fire extinguisher manifold assembly; and the inlet is configured to engage a fire bottle.

* * * * *